US009483871B2

(12) United States Patent
Sung et al.

(10) Patent No.: US 9,483,871 B2
(45) Date of Patent: Nov. 1, 2016

(54) 360-DEGREE CORE PHOTO IMAGE INTEGRATION AND INTERPRETATION IN A 3D PETROPHYSICAL MODELING ENVIRONMENT

(71) Applicant: Saudi Arabian Oil Company, Dhahran (SA)

(72) Inventors: Roger R. Sung, Dhahran (SA); Yunsheng Li, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 160 days.

(21) Appl. No.: 14/224,815

(22) Filed: Mar. 25, 2014

(65) Prior Publication Data

US 2015/0279093 A1 Oct. 1, 2015

(51) Int. Cl.
*G06T 17/05* (2011.01)
*E21B 47/00* (2012.01)
*G01V 8/02* (2006.01)
*E21B 25/00* (2006.01)
*G01V 99/00* (2009.01)

(52) U.S. Cl.
CPC .............. *G06T 17/05* (2013.01); *E21B 25/00* (2013.01); *E21B 47/0002* (2013.01); *G01V 8/02* (2013.01); *G01V 99/005* (2013.01)

(58) Field of Classification Search
None
See application file for complete search history.

(56) References Cited

U.S. PATENT DOCUMENTS

| | | | |
|---|---|---|---|
| 4,542,648 A | 9/1985 | Vinegar et al. | |
| 7,363,158 B2 | 4/2008 | Stelting et al. | |
| 7,970,545 B2 | 6/2011 | Sanstrom | |
| 8,385,604 B2 | 2/2013 | Orpen | |
| 8,605,951 B2 | 12/2013 | Baggs et al. | |
| 8,933,929 B1 * | 1/2015 | Filip | G06K 9/32 345/419 |
| 2006/0031017 A1 * | 2/2006 | Mathieu | G01V 3/20 702/6 |
| 2007/0061079 A1 * | 3/2007 | Hu | E21B 47/04 702/6 |
| 2007/0239359 A1 | 10/2007 | Stelting et al. | |
| 2009/0080705 A1 * | 3/2009 | Orpen | G01N 33/24 382/109 |
| 2010/0198638 A1 | 8/2010 | Deffenbaugh et al. | |
| 2010/0305927 A1 | 12/2010 | Suarez-Rivera et al. | |

(Continued)

OTHER PUBLICATIONS

"WellCAD Software 4.4; Book 1—Basics," 2012, Advanced Logic Technology, pp. 10-11 & 25-27, retrieved from http://web.archive.org/web/20120324170347/http://www.alt.lu/pdf/WellCAD_Basics.pdf on Nov. 23, 2015.*

(Continued)

*Primary Examiner* — Ryan D McCulley
(74) *Attorney, Agent, or Firm* — Fish & Richardson P.C.

(57) ABSTRACT

The present disclosure describes methods and systems, including computer-implemented methods, computer-program products, and computer systems, for providing 360-degree well core sample photo image integration, calibration, and interpretation for modeling of reservoir formations and lithofacies distribution. One computer-implemented method includes receiving a 360-degree well core sample photo image, geospatially anchoring, by a computer, the received 360-degree well core sample photo image, decomposing, by a computer, the geospatially-anchored 360-degree well core sample photo image into a color numerical array, transforming, by a computer, the color numerical array into a formation image log, calibrating, by a computer, the formation image log for consistency with additionally available data, and generating, by a computer, 3D lithofacies interpretation and prediction data using the formation image log.

20 Claims, 8 Drawing Sheets
(5 of 8 Drawing Sheet(s) Filed in Color)

(56) References Cited

U.S. PATENT DOCUMENTS

2012/0221306 A1    8/2012    Hurley et al.
2013/0080133 A1    3/2013    Sung et al.
2013/0297272 A1    11/2013   Sung et al.

OTHER PUBLICATIONS

DMT; "DMT CoreScan 3 High-Tech Core Logging Tool"; http://www.corescan.de/fileadmin/downloads/DMT_CoreScan3_Info.pdf; Jan. 31, 2013; pp. 1-20.

Gaillot et al.; "Contribution of Borehole Digital Imagery in Core-Logic-Seismic Integration"; Scientific Drilling, No. 5; Sep. 2007; pp. 50-53.

Paulsen et al.; "A Simple Method for Orienting Drill Core by Correlating Features in Whole-Core Scans and Oriented Borehole-Wall Imagery"; Journal of Structural Geology; Published in 2002; pp. 1233-1238.

PCT International Search Report and Written Opinion of the International Searching Authority issued in International Application No. PCT/US2015/022492 on Aug. 4, 2015; 11 pages.

Teagle et al.; "Methods" Proceedings of the Integrated Ocean Drilling Program, vol. 309/312; Published in 2006; pp. 1-70.

Wilkens et al.; "Data Report: Digital Core Images as Data: An Example from IODP Expedition 303"; Proceedings of the Integrated Ocean Drilling Program, vol. 303/306; Published in 2009; pp. 1-16.

* cited by examiner

360-DEGREE CORE PHOTO IMAGE INTEGRATION AND INTERPRETATION IN A 3D PETROPHYSICAL MODELING ENVIRONMENT

BACKGROUND

Borehole image logs currently provide the highest resolution digital data for reservoir formation evaluations. The borehole image logs are typically produced by transmitting signals, for example, acoustic, radio, and the like, into wellbore rock and receiving/processing the reflected signals to generate/log borehole image data. From the borehole image log, various geological attributes such as structural dip, faults, fractures, and porosity can be interpreted. The lack of actual borehole image log data can, in some instances, hinder performance of interpretation and/or processing functions or necessitate estimation/assumption of data used for the interpretation and/or processing functions. Estimation/assumption of data can result in less-than-accurate lithofacies interpretations by petrophysical interpretation application systems and three-dimensional (3D) lithofacies models of reservoir formations and lithofacies distributions by 3D petrophysical modeling application systems. Inaccurate results can cause wasteful expenditures of time and business resources and result in lost business opportunities and/or revenue.

SUMMARY

The present disclosure describes methods and systems, including computer-implemented methods, computer-program products, and computer systems, for providing 360-degree well core sample photo image integration, calibration, and interpretation for modeling of reservoir formations and lithofacies distribution. One computer-implemented method includes receiving a 360-degree well core sample photo image, geospatially anchoring, by a computer, the received 360-degree well core sample photo image, decomposing, by a computer, the geospatially-anchored 360-degree well core sample photo image into a color numerical array, transforming, by a computer, the color numerical array into a formation image log, calibrating, by a computer, the formation image log for consistency with additionally available data, and generating, by a computer, 3D lithofacies interpretation and prediction data using the formation image log.

Other implementations of this aspect include corresponding computer systems, apparatuses, and computer programs recorded on one or more computer-readable media/storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein geospatially anchoring the 360-degree well core sample photo image includes using at least one of compass direction, latitude/longitude, Global Positioning System (GPS) coordinates, or depth reference data.

A second aspect, combinable with any of the previous aspects, wherein the color numerical array comprises data for at least one of blue, green, grayscale, or red.

A third aspect, combinable with any of the previous aspects, wherein the formation image log is in borehole image log format.

A fourth aspect, combinable with any of the previous aspects, wherein the additionally available data includes at least in one of wellbore azimuth data, borehole image log data, or 3D seismic data.

A fifth aspect, combinable with any of the previous aspects, comparing data associated with the formation image log to the additionally available data, and determining that the formation image log needs to be calibrated because a result of the comparison exceeds a threshold value.

A sixth aspect, combinable with any of the previous aspects, further comprising generating 3D models of lithofacies distributions using the 3D lithofacies interpretation and prediction data.

The subject matter described in this specification can be implemented in particular implementations so as to realize one or more of the following advantages. First, in the instance where borehole image log data is not available, available well cores samples can be transformed into well core image sample data as formation image logs in borehole image log format and be used to provide additional data to increase accuracy of lithofacies modeling of reservoir formations. Second, 360-degrees of well core image sample data is loaded into a digital interpretation application system for analysis to ensure complete wellbore coverage. Third, the well core sample image data is decomposed and typically put into a standard borehole image log format for increased flexibility and usability by existing tools. Fourth, the standardized borehole image log formatted data can be provided to a petrophysical interpretation application system to interpret lithofacies and/or lithofacies distribution. Fifth, a 3D petrophysical model application system can be used to model reservoir formations based on the additional interpreted lithofacies and/or lithofacies distribution. Sixth, in wells which have well core sample data but no formation image log data, a formation image log can be simulated. This could lead to the substantial cost saving in contrast to acquiring actual additional formation image log data. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

Like reference numbers and designations in the various drawings indicate like elements.

DETAILED DESCRIPTION

This disclosure generally describes methods and systems, including computer-implemented methods, computer-program products, and computer systems, for providing 360-degree well core sample photo image integration and interpretation for modeling of reservoir formations and lithofacies distribution. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Borehole image logging is a measurement of rock formations around the wellbore. Borehole image logging data is acquired through different types of logging tools transmitting and receiving signals (e.g., acoustic, radio, and/or signals) into and from, respectively, the wellbore. While accurate, it is still an electronic measurement requiring a well drill bit to be removed from the wellbore while gathering borehole image log data; a process that takes time and effort to accomplish. Usually only a small fraction of wells in a field development have borehole image logs taken. Generally, a far higher percentage of wells drilled have well core data as opposed to borehole image log data.

Borehole image logs currently provide the highest resolution digital data for reservoir formation evaluations. From a particular borehole image log, various geological attributes such as structural dip, faults, fractures, and/or porosity can be interpreted. The lack of actual borehole image log data can, in some instances, hinder performance of interpretation and/or processing functions or necessitate estimation/assumption of data used for the interpretation and/or processing functions. Estimation/assumption of data can result in less-than-accurate lithofacies interpretations by petrophysical interpretation application systems and three-dimensional (3D) lithofacies models of reservoir formations and lithofacies distributions by 3D petrophysical modeling application systems. Inaccurate results can result wasted time, needless expenditure of business resources, and/or lost business opportunity and/or revenue.

A well core sample is a piece of rock including one or more lithofacies extracted from a wellbore beneath the earth's surface that provides actual/accurate physical evidence of reservoir formation characteristics (e.g., rock type, formation thickness, etc.). In some instances, well core samples can also reveal structural dip, fault, fracture, porosity, mineral composition, and/or other values, conditions, etc. Traditionally, geologists or other experts visually examine a well core sample and describe it on paper or in other formats.

In some instances, a 360-degree photograph, such as in bitmap, GIF, JPG, or other graphics format, of the well core sample can be taken by a camera, stored as a digital image, and studied by geologists or other experts. While the photograph generates a 360-degree visualization of the well core sample (and by extension the wellbore—because the well core sample is a mirror image of the rock left around the perimeter of the wellbore.), due to its native format (i.e., a visual image) and the fact that it is dimensionless (e.g., no spatial and/or vertical depth information), it cannot be natively used by a digital reservoir characterization and interpretation application system to contribute to 3D petrophysical modeling. A well core sample photograph can only provide a qualitative reference, not quantitative data that fits within a digital interpretation application. No side-by-side correlation and calibration with other types of digital data (e.g., borehole image log and wire line log data) can be performed.

Among other things, the described computer-implemented methods, computer-program products, and systems allow use of natively formatted 360-degree photographs for interpretation and modeling of reservoir formations and lithofacies distribution.

At a high level, this disclosure is drawn to converting a well core sample photograph into digital lithofacies data to guide 3D petrophysical digital interpretation and modeling. The disclosure discusses transformation of a traditional well core sample photograph, geospatial positioning of the well core sample photograph in proper 3D space (e.g., area geographic coordinates, depth, and/or the like), and conversion of the geospatially positioned well core sample photograph into a formation image log in a digital borehole image log format. For example, by aligning with azimuth information from the associated well, a formation image log generated from a geospatially positioned well core sample photograph can be digitally analyzed using interpretation functionalities available for use on borehole image log formatted data.

In wells where both well core sample photo images and other data exists (e.g., borehole image log data, wire line log data, and/or other data), the described transformation of a well core sample photograph offers correlation of the same rock formation from two or more different types of measurements. By interpreting and calibrating the formation image log data with the other, if available, data, confidence can be increased in geology interpreted from the formation image log data. Once correlation and confidence is established on these wells, the method described below can be applied to wells where no borehole image log data (or other data) exists. As many wells have well core sample data but not expensive borehole image log data, the subject matter of this disclosure can assist with prediction of reservoir formations in wells with no high-resolution borehole image log data and at a potentially substantial cost savings—by minimizing the need to acquire expensive borehole image logs. The interpretation of the generated formation image log can provide sufficient data points to model a reservoir in 3D and enhance overall field understanding.

Figure 1:
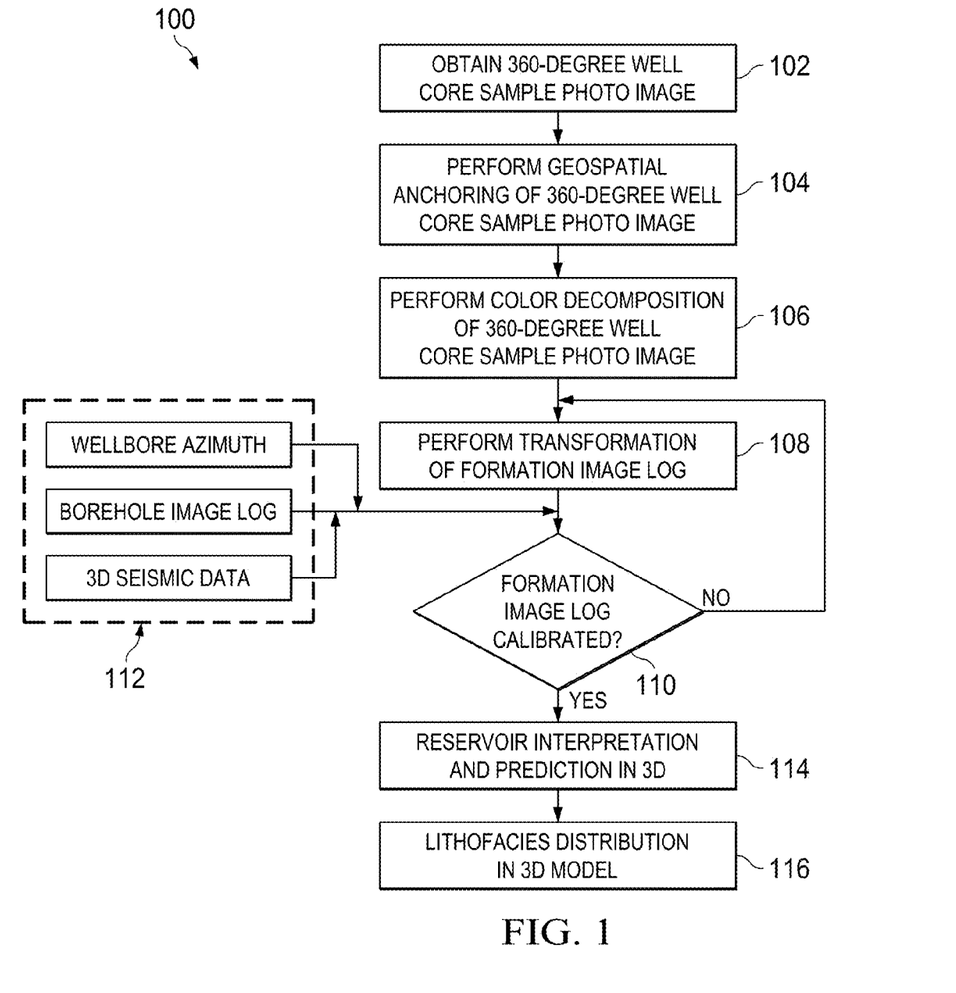
FIG. 1 illustrates a method for providing 360-degree well core sample photo image integration, calibration, and interpretation for modeling of reservoir formations and lithofacies distribution according to an implementation.

FIG. 1 illustrates a method 100 for providing 360-degree well core sample photo image integration, calibration, and interpretation for modeling of reservoir formations and lithofacies distribution according to an implementation. In other words, method 100 is a 360-degree well core sample interpretation and 3D modeling application workflow. For clarity of presentation, the description that follows generally describes method 100 in the context of FIGS. 1-6, 7A-7B, and 8. Method 100 may be performed by any suitable system, environment, software, and/or hardware, or a combination of systems, environments, software, and/or hardware as appropriate (e.g., the computer system described in FIG. 8 below). In some implementations, various steps of method 100 can be run in parallel, in combination, in loops, or in any order.

At 102, a 360-degree well core sample photo image is received. For example, in some implementations, camera 840 described in FIG. 8 below can be used to obtain the 360-degree well core sample photo image and to transmit it over network 830 to computer 802 for processing.

Figure 2:
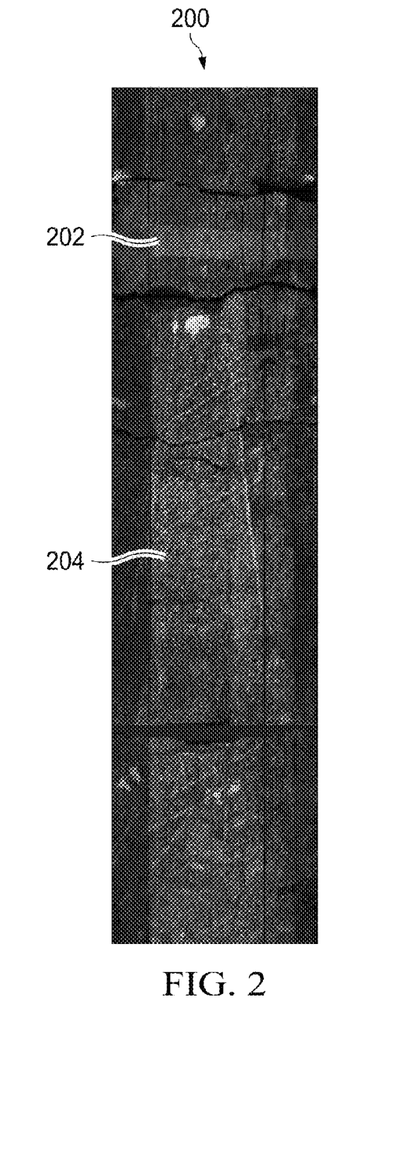
FIG. 2 illustrates a 360-degree photo image of a well core sample according to an implementation.

Turning to FIG. 2, FIG. 2 illustrates a 360-degree well core sample photo image 200 according to an implementation. In this implementation, the 360-degree well core sample photo image 200 has been "rolled" flat into a two-dimensional representation. Various lithofacies, for example, lithofacies 202 and 204, can be noted in the 360-degree well core sample photo image 200. Also note, as described above, that the native 360-degree well core sample photo image 200 has no dimensionality. In some implementations, information about the image (including dimensionality information) can be stored in image headers, metadata, etc. Returning to FIG. 1, from 102, method 100 proceeds to 104.

At 104, the dimensionless 360-degree well core sample photo image 200 is geospatially anchored into a proper 3D location in a 3D environment. For example, the 360-degree well core sample photo image 200 can be enhanced with geospatial anchoring data (e.g., compass direction), latitude/longitude coordinates, depth data including top and bottom depth of the core, and the like. This can be likened to taking a picture of trees along a hiking trail next to a particular mountain in a group of mountains. If one looks at the photograph without any additional context, one will not easily be able to tell whether it was taken next to mountain A with an elevation X or from mountain B with an elevation Y. However, if Global Positioning System (GPS) system coordinates and proper elevation of the photographed site is included with the photograph, then the photograph has much more meaning. For example, details and variation patterns of the photographed trees' leaves will have much more meaning—e.g., the trees can be re-located, studied further, etc. for subsequent digital studies.

Figure 3:
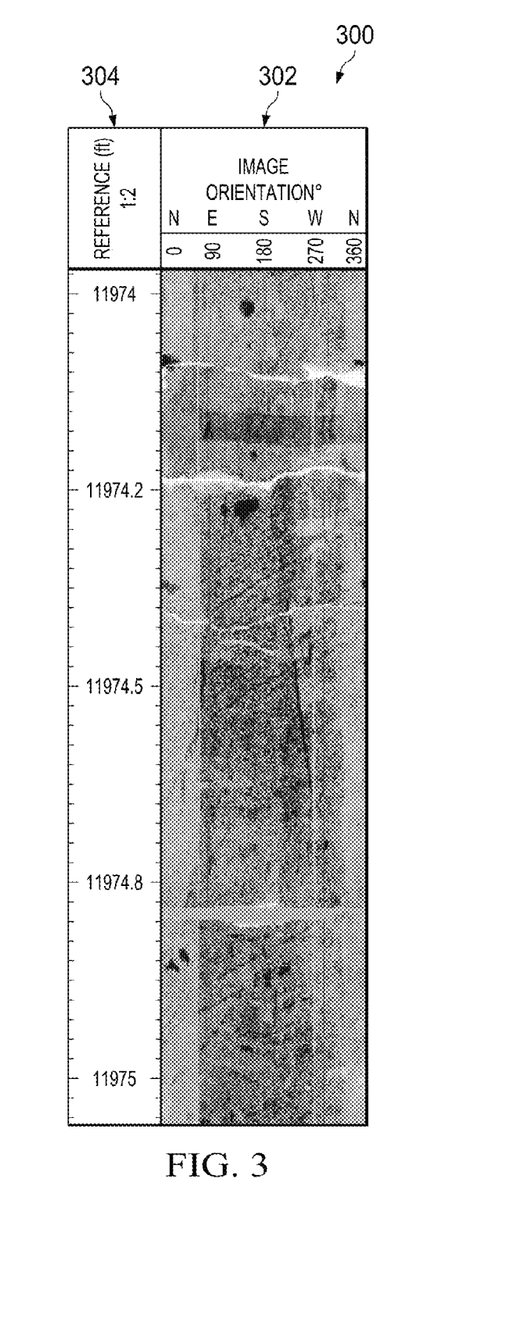
FIG. 3 illustrates a geospatially-anchored 360-degree digital photo image of the well core sample of FIG. 2 according to an implementation.

Turning to FIG. 3, FIG. 3 illustrates a geospatially-anchored 360-degree digital photo image 300 of the well core sample of FIG. 2 according to an implementation. Note that the 360-degree digital photo image 300 has been geospatially anchored with at least image orientation data 302 and reference depth data 304. In implementations, the orientation data 302 can be a default value that can be adjusted at a later point (e.g., see FIG. 5 and explanation below—the left-most track is set at due North or 0 degrees). In some implementations, other anchoring-type data can also be used to enhance the 360-degree digital photo image 300 (e.g., compass direction, latitude/longitude, GPS coordinates, and the like). Returning to FIG. 1, from 104, method 100 proceeds to 106.

At 106, color variation of the 360-degree digital photo image 300 of FIG. 3 is decomposed into color numerical arrays consistent with a formation image log format (described in more detail below). For example, the illustrated yellow/golden color "style" of FIG. 3 represents that the displayed image is no longer a pure photograph but generated from the color numerical arrays. In some implementations, the color variations of the geospatially-anchored 360-degree digital photo image 300 are decomposed into specific color numerical arrays of blue, green, grayscale, and red colors. In other implementations, additional, less, or different colors can be used for the color numerical arrays depending upon the particular purposes of method 100 or any other aspect of this disclosure.

Figure 4:
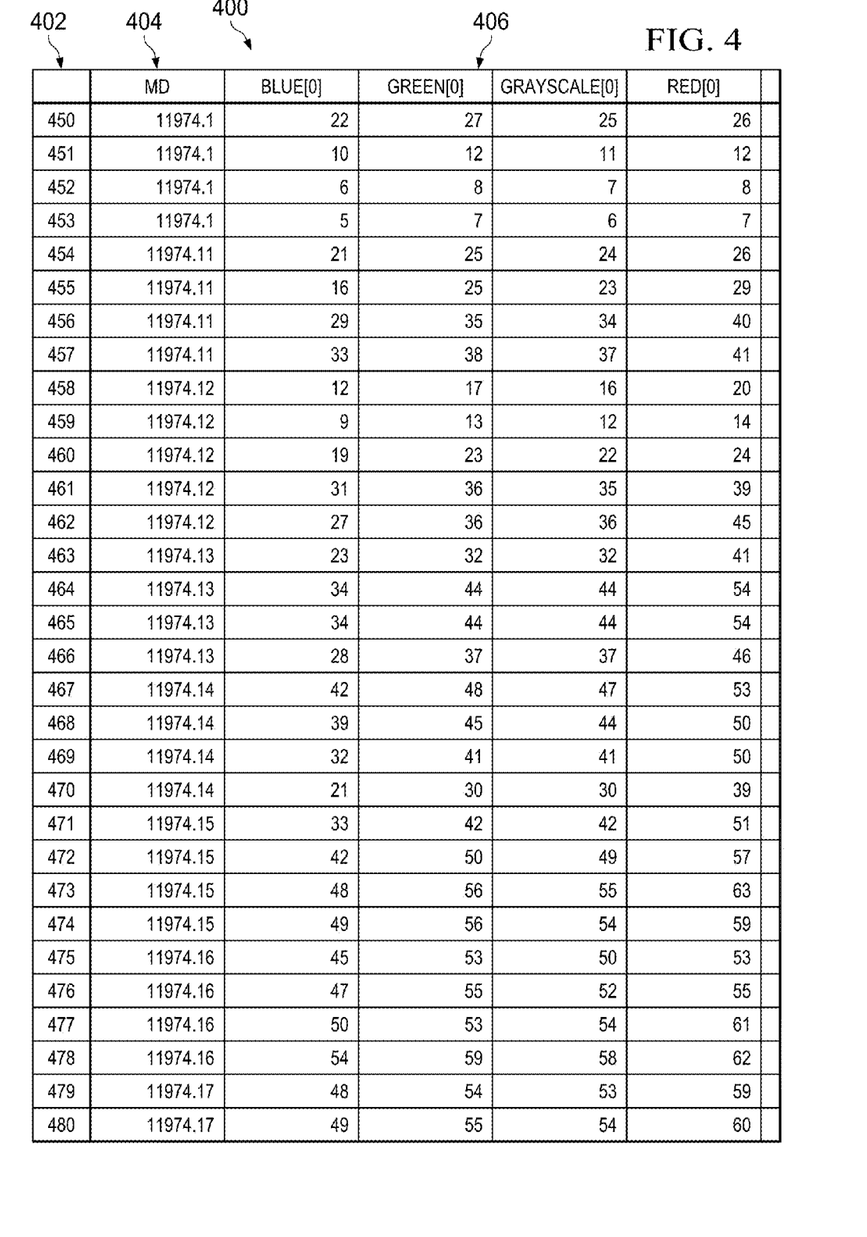
FIG. 4 illustrates an example decomposition of color variations in the 360-degree well core sample photo image of FIG. 3 into color numerical arrays according to an implementation.

Turning to FIG. 4, FIG. 4 illustrates an example decomposition 400 of color variations in the geospatially-anchored 360-degree well core sample photo image of FIG. 3 into color numerical arrays according to an implementation. For the color numerical array, a sample number is represented by sample number 402. The measure depth 404 represents the measuring depth of the sample number 402. Depending upon the color complexity along a horizontal strip at a particular measure depth, some measure depths can have multiple sample numbers 402 (e.g., 11974.11 and 11974.12). The color numerical array values 406 (e.g., BLUE[0], GREEN[0], etc.) are, in some implementations, measured in intensity.

Returning to FIG. 1, from 106, method 100 proceeds to 108.

At 108, the generated color numerical array(s) at 106 are transformed into a formation image log. In some implementations, the formation image log is in a borehole image log format. In other implementations, the formation image log can be in any format suitable for the particular purposes of method 100 or any other aspect of this disclosure. The formation image log data allows rich digital interpretation functionality for reservoir characterization, interpretation, modeling, etc. From 108, method 100 proceeds to 110.

At 110, a determination is made as to whether the formation image log is calibrated. If, at 110, it is determined that the formation image log is calibrated, method 100 proceeds to 114. If at 110, it is determined that the formation image log is not calibrated, method 100 proceeds to 108. In some implementations, determination of whether the formation image log is calibrated can be made depending upon whether there is additional data (e.g., additional data 112—wellbore azimuth, an actual borehole image log, 3D seismic data, core description digital data, and/or other additional data) that can be used to calibrate (e.g., modify) the formation image log with and/or whether the formation image log is consistent—within some threshold value (e.g., a percentage, measurement, etc.)—with the additional data 112. For example, if wellbore azimuth data is available for a particular well for which a formation image log has been created, the formation image log can be calibrated to make the formation image log consistent with the wellbore azimuth data to ensure that the formation image log data is aligned with the actual wellbore direction. This introduces an additional assurance that the formation image log is as accurate/complete as possible. In some implementations, the threshold value can be predetermined and/or dynamically calculated based on any data received, processed, and/or generated by method 100.

Figure 5:
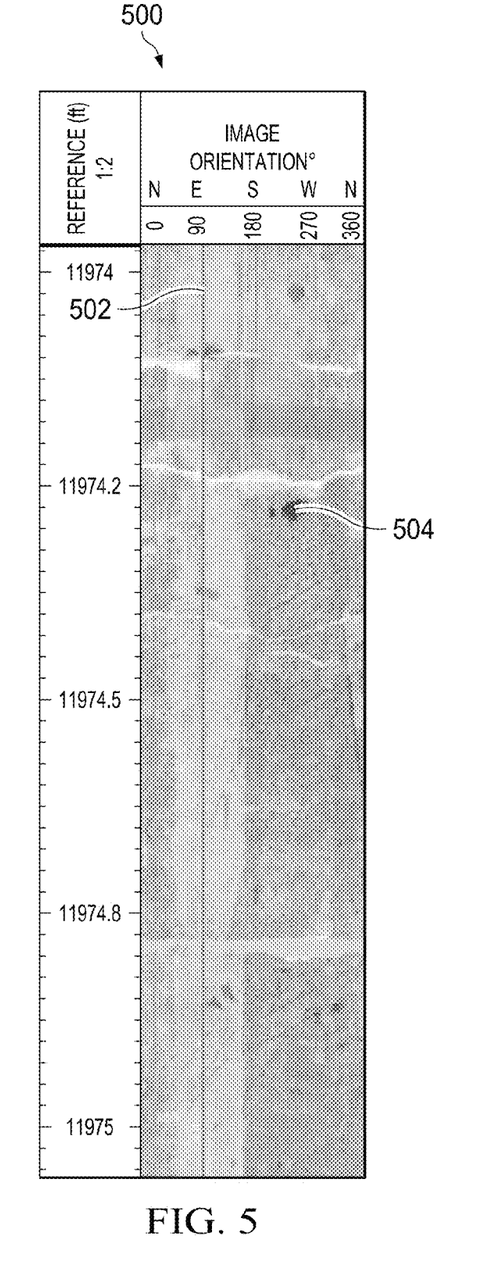
FIG. 5 illustrates the rotation of the 360-degree well core sample photo image of FIG. 3 based upon a calibrated formation image log with at least available azimuth data according to an implementation.

Turning to FIG. 5, FIG. 5 illustrates a rotation 500 of the 360-degree well core sample photo image of FIG. 3 based upon a calibrated the formation image log with at least available wellbore azimuth data (part of additional data 112) according to an implementation. Note that the 360-degree well core sample photo image 300 has been rotated to align with wellbore azimuth line 502. This can be seen by looking at core feature 504 which has been moved to the right when compared to both FIGS. 2 and 3 with data "wrapped around" from the right to the left of the image. In the case where the 360-degree well core sample photo image 300 has already been rotated, the associated formation image log data can be compared with the additional data 112 (e.g., actual well bore azimuth data) to ensure that the formation image log is consistent with the additional data 112. The calibration process is typically an iterative process using one or more types of available data 112. From 108, method 100 proceeds to 110.

At 114, the calibrated image log is used to generate 3D lithofacies interpretation and prediction data using a petrophysical interpretation application. From 114, method 100 proceeds to 116.

At 116, the generated 3D lithofacies interpretation and prediction data is used to generate 3D models of lithofacies distributions using a 3D petrophysical modeling application. From 116, method 100 stops.

Figure 6:
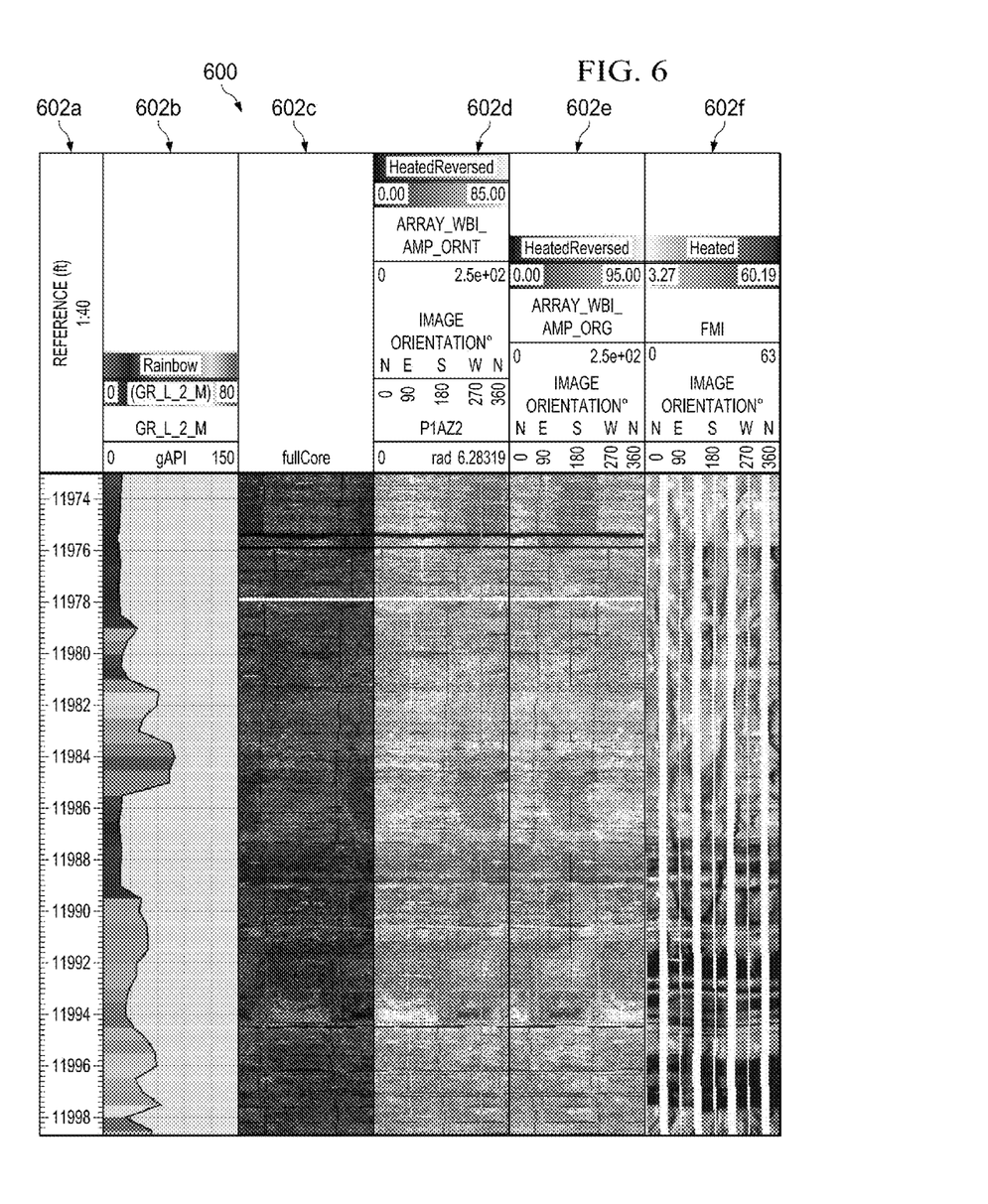
FIG. 6 illustrates digital calibration associated with a well to gain confidence for prediction according to an implementation.

Turning to FIG. 6, FIG. 6 illustrates digital calibration associated with a well to gain confidence for prediction according to an implementation. As illustrated, there are six tracks (602a-602f) from left to right. Track 602a illustrates the measure depth (MD). Track 602b illustrates a Gamma Ray wireline log displayed in a rainbow color table. Track 602c illustrates the 360-degree core photo image (e.g., as illustrated in FIG. 2). Track 602d is a converted formation image log with a planned azimuth rotation angle of 272 degrees (after calibration from other well information and data) indicated by the green line (e.g., as illustrated in FIG. 5). Track 602e is the azimuth-aligned formation image log 602d. Track 602f is an actual borehole image log acquired at the well and providing data for calibration/comparison for 602e. Should confidence and experience increase from this exercise by comparisons of the described data, the method can be applied to other wells (e.g., wells geographically situated near the subject well above) where no actual borehole image log data has been acquired. Confidence is typically determined by a visual comparison (e.g., of 602e and 602f described above). If the result of the visual comparison is that the compared data is relatively/reasonably similar (possibly based on a set and/or dynamically determined threshold), confidence increases that the performed method can be successfully used on other wells. Other wells typically refers to those with only well core samples, well core sample photo images, etc. but no formation image log. If a well as a formation image log, then there is no need to generate a simulated formation image log using the described method.

Figure 7A:
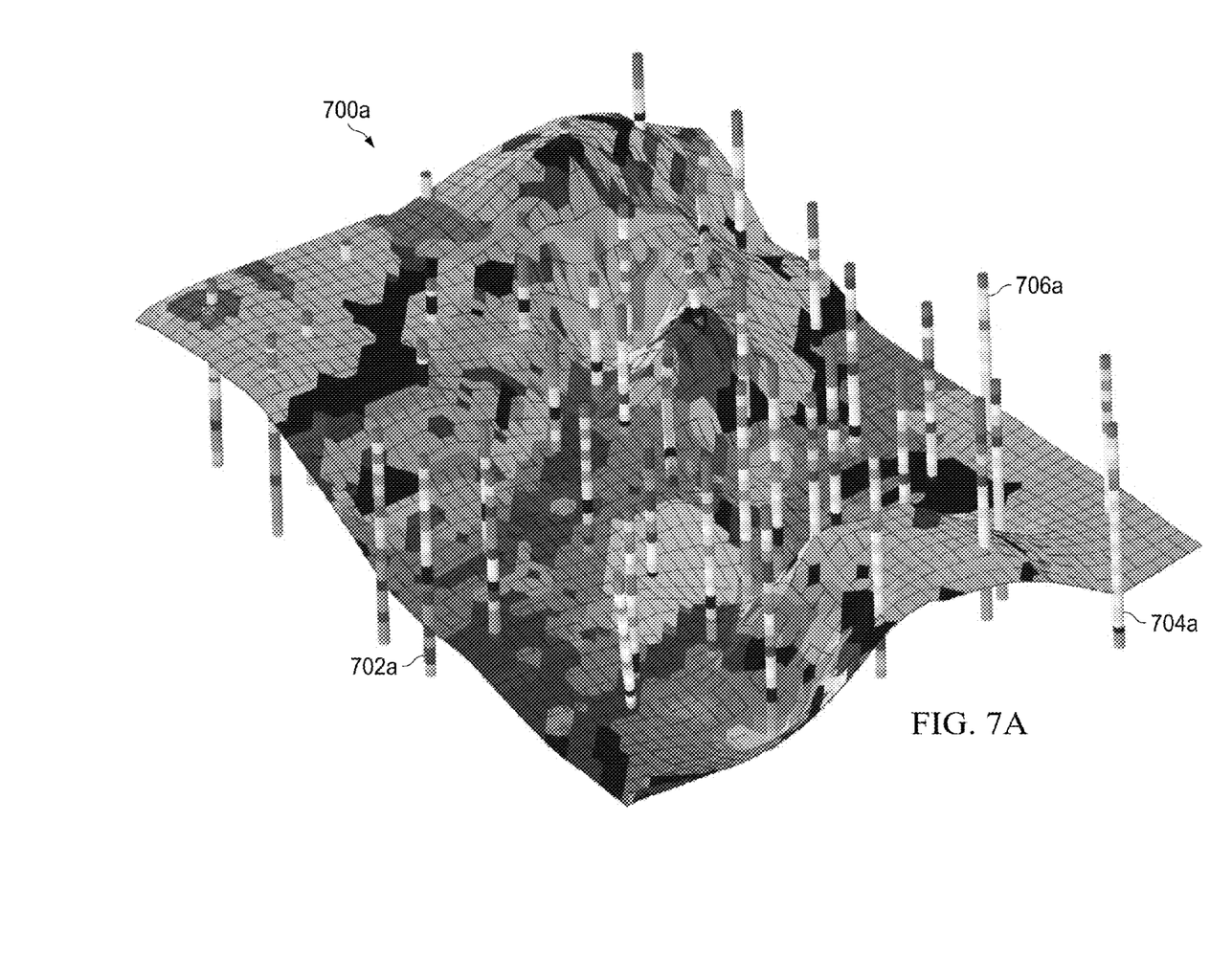
FIG. 7A illustrates one of the layer in a 3D petrophysical model highlighting lithofacies distribution according to an implementation.

Turning to FIG. 7A, FIG. 7A illustrates a 360-degree formation image log interpretation and 3D lithofacies model 7A of an example well field based upon one or more 360-degrees formation image log interpretations according to an implementation. For example, 3D lithofacies modeling of wellbores 702a, 704a, and 706a from 360-degree formation image log interpretations is illustrated in FIG. 7A. Using the 360-degree formation image log interpretations, additional lithofacies associated with other wells can be predicted even without 360-degree well core sample photo images, borehole image data, etc.

Figure 7B:
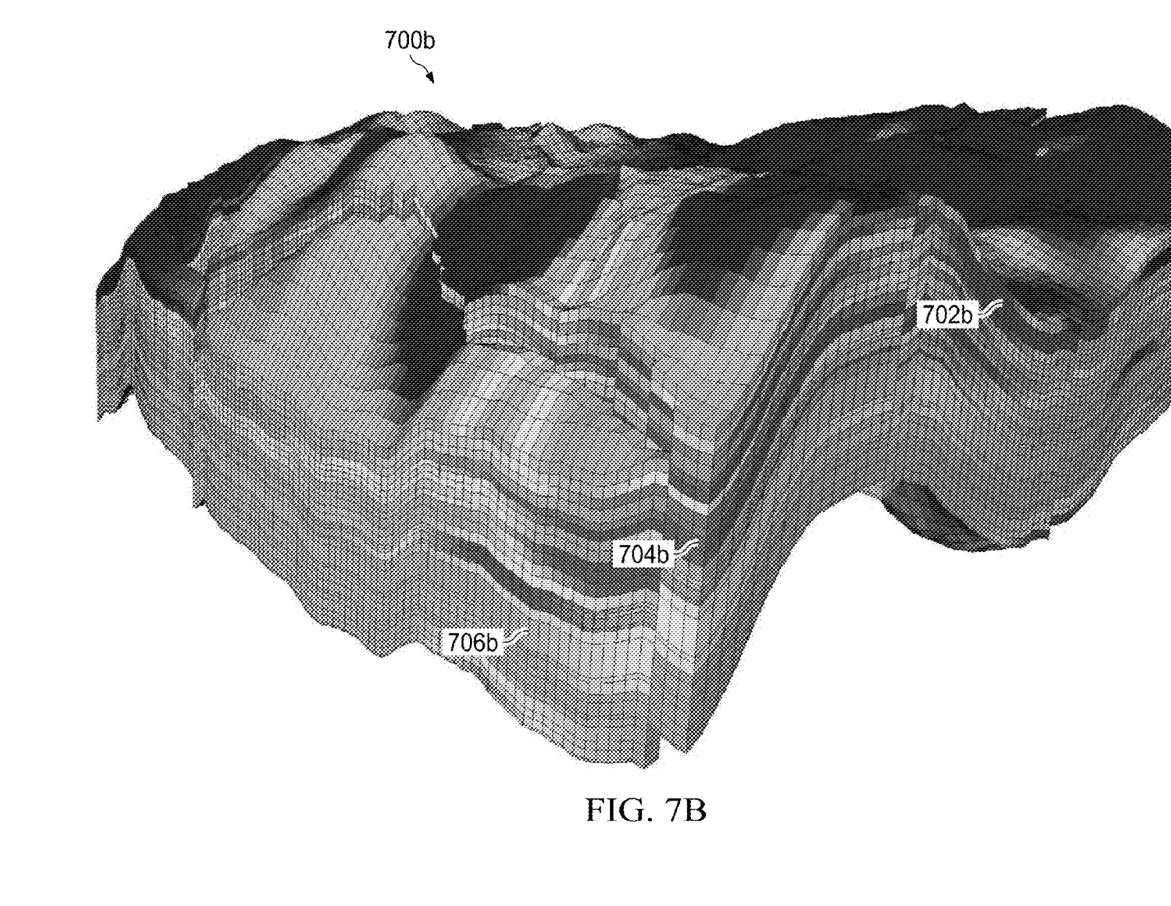
FIG. 7B illustrates a 3D petrophysical model with lithofacies distribution according to an implementation.

Turning to FIG. 7B, FIG. 7B illustrates a generated 3D lithofacies distribution model 7B00 based upon one or more 360-degree formation image logs and interpretations (e.g., those illustrated in FIG. 7A) according to an implementation. For example, 3D lithofacies modeling of wellbores 702, 704, and 706 from 360-degrees formation image log interpretations as illustrated in FIG. 7A is used to generate 3D lithofacies distribution model 7B. For example, distributions of lithofacies 702b, 704b, and 706b) are illustrated in the 3D lithofacies distribution model 7B.

Figure 8:
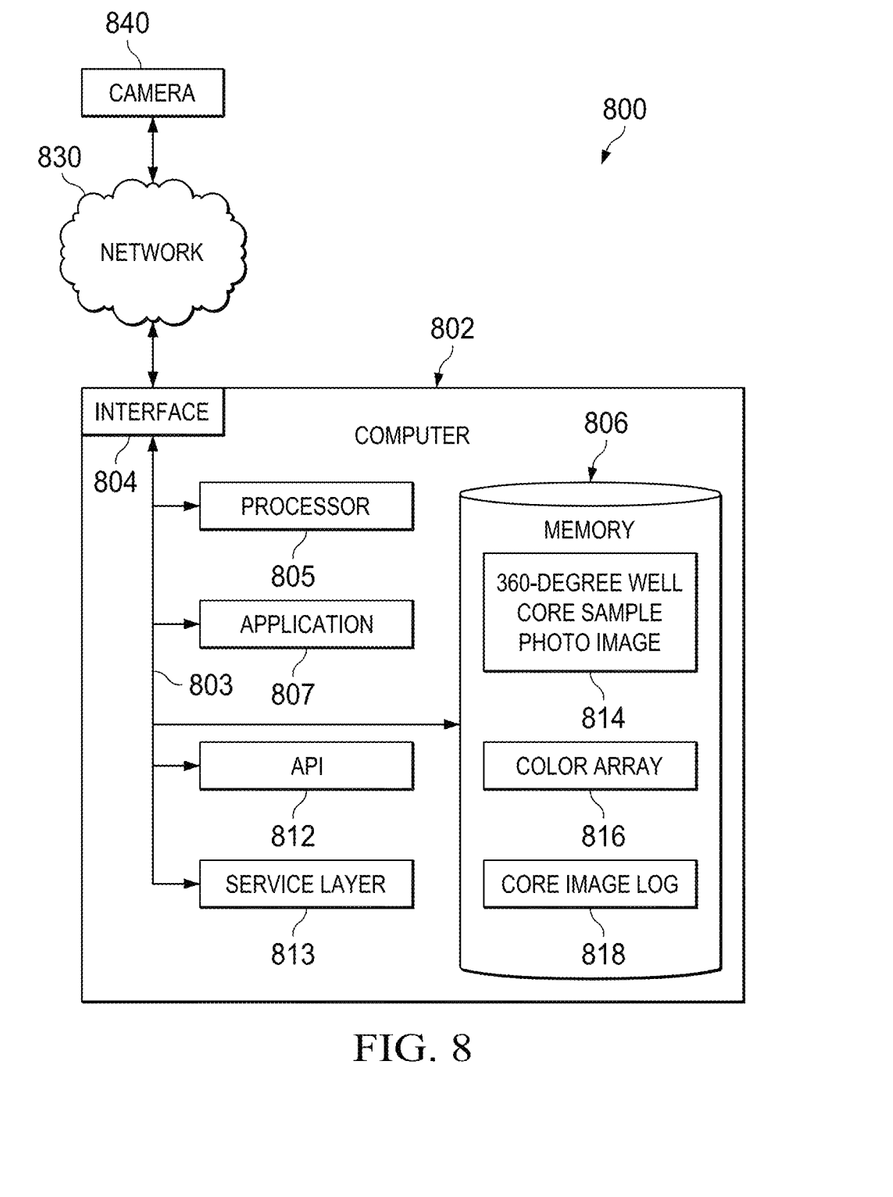
FIG. 8 is a block diagram illustrating an exemplary distributed computer system (EDCS) used to provide 360-degree well core sample photo image integration, calibration, and interpretation for modeling of reservoir formations and lithofacies distribution according to an implementation.

Turning to FIG. 8, FIG. 8 is a block diagram illustrating an exemplary distributed computer system (EDCS) 800 used to provide 360-degree well core sample image integration and interpretation for modeling of reservoir formations and lithofacies distribution according to an implementation. In some implementations, the EDCS 800 includes a computer 802, network 830, and camera 840.

The illustrated computer 802 is intended to encompass a computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. The computer 802 may comprise a computer that includes an input device, such as a keypad, keyboard, touch screen, or other device (not illustrated) that can accept user information, and an output device (not illustrated) that conveys information associated with the operation of the computer 802, including digital data, visual and/or audio information, or a user interface.

The computer 802 can serve as a client and/or a server. In typical implementations, the computer 802 act as either a parallel processing node 102, host for a software agent 304, and/or a host for an executing simulation 202, simulator 204, library function 106, system administration 312, and/or other application consistent with this disclosure (even if not illustrated). The illustrated computer 802 is communicably coupled with a network 830. In some implementations, one or more components of the computer 802 may be configured to operate within a parallel-processing and/or cloud-computing-based environment. Implementations of the computer 802 can also communicate using message passing interface (MPI) or other interface over network 830.

At a high level, the computer 802 is an electronic computing device operable to receive, transmit, process, store, or manage data and information associated with modeling of reservoir formations and lithofacies distribution. According to some implementations, the computer 802 may also include or be communicably coupled with a simulation server, application server, e-mail server, web server, caching server, streaming data server, business intelligence (BI) server, and/or other server.

The computer 802 can receive requests over network 830 from an application 807 (e.g., executing on another computer 802) and responding to the received requests by processing the said requests in an appropriate software application 807. In addition, requests may also be sent to the computer 802 from internal users (e.g., from a command console or by other appropriate access method), external or third-parties, other automated applications, as well as any other appropriate entities, individuals, systems, or computers.

Each of the components of the computer 802 can communicate using a system bus 803. In some implementations, any and/or all the components of the computer 802, both hardware and/or software, may interface with each other and/or the interface 804 over the system bus 803 using an application programming interface (API) 812 and/or a service layer 813. The API 812 may include specifications for routines, data structures, and object classes. The API 812 may be either computer-language independent or dependent and refer to a complete interface, a single function, or even a set of APIs. The service layer 813 provides software services to the computer 802 and/or system of which the computer 802 is a part. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 and/or the service layer 813 as stand-alone components in relation to other components of the computer 802. Moreover, any or all parts of the API 812 and/or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems in a distributed environment—including a parallel processing environment—connected to the network 830 (whether illustrated or not). Generally, the interface 804 comprises logic encoded in software and/or hardware in a suitable combination and operable to communicate with the network 830. More specifically, the interface 804 may comprise software supporting one or more communication protocols associated with communications over network 830.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802. Specifically, the processor 805 executes the functionality required to model reservoir formations and lithofacies distribution.

The computer 802 also includes a memory 806 that holds data for the computer 802 and/or other components of a system of which the computer is a part. Although illustrated as a single memory 806 in FIG. 8, two or more memories may be used according to particular needs, desires, or particular implementations of the computer 802. While memory 806 is illustrated as an integral component of the computer 802, in alternative implementations, memory 806 can be external to the computer 802. In some implementations, memory 806 can hold and/or reference one or more of, as described above, a 360-degree well core sample photo image 814, color numerical array 816, and/or formation image log 818.

The application 807 is an algorithmic software engine providing functionality according to particular needs, desires, or particular implementations of the computer 802 and/or a system of which the computer 802 is a part, particularly with respect to functionality required to model reservoir formations and lithofacies distribution. For example, application 807 can serve as (or a portion of) a simulation 202, simulator 204, parallel processing node 102, library function 106, software agent 304, system administrator 312, and/or other application consistent with this disclosure (whether illustrated or not). In some implementations, software applications can include one or more of the above-described digital photo interpretation application, petrophysical interpretation application, and/or petrophysical modeling application. Although illustrated as a single application 807, the application 807 may be implemented as multiple applications 807 on the computer 802. In addition, although illustrated as integral to the computer 802, in alternative implementations, the application 807 can be external to and execute apart from the computer 802.

There may be any number of computers 802 associated with a computer system performing functions consistent with this disclosure. Further, the term "client," "user," and other appropriate terminology may be used interchangeably as appropriate without departing from the scope of this disclosure. Moreover, this disclosure contemplates that many users/processes may use one computer 802, or that one user/process may use multiple computers 802.

Camera 840 is operable to at least capture a 360-degree image of a well core sample. In some implementations, camera 840 can use a lens assembly to focus light onto an electronic image sensor and digitally record image information into a memory (not illustrated) in various digital file formats. For example, digital file formats used to record the image information may be JPG, GIF, BMP, TIFF, PNG, AVI, DV, MPEG, MOV, WMV, RAW, or other suitable digital file format. In some implementations, the electronic image sensor can be a charge coupled device (CCD), an active pixel sensor (CMOS), or other suitable electronic image sensor. Camera 840 may provide a live preview of the external image source to be photographed. Camera 840 may also provide optical and/or digital zoom functionality and panoramic images in both two and three dimensions. In other implementations, the recorded image information can be both still and video with sound.

In some implementations, image data recorded by camera 840 may also be transferred over network 830 to a remote data storage location (not illustrated) instead of being stored in memory 806. Although illustrated as communicably connected (e.g., by a cable, wireless connection, etc.) through network 830 to computer 802, in some implementations, camera 840 may also be integrated into computer 802 and/or other component (not illustrated) of computer system 800 or directly connected to an interface port (not illustrated) on computer 802. While the computer system 800 is illustrated as containing a single camera 840, alternative implementations of computer system 800 may include any number of cameras 840, working individually or in concert, and suitable to the purposes of the EDCS 800. In some implementations, camera(s) 840 can be part of a mechanical assembly (not illustrated) for moving, adjusting, stabilizing, etc. the camera(s) 840 and/or a well core sample to obtain the 360-degree image of the well core sample.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a co-processor (e.g., a graphics/visual processing unit (GPU/VPU)), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI)

that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving a dimensionless 360-degree well core sample photo image;
   geospatially anchoring, by a computer, the received dimensionless 360-degree well core sample photo image by enhancing the dimensionless 360-degree well core sample photo image with three-dimensional geospatial positioning data;
   decomposing, by a computer, the geospatially-anchored 360-degree well core sample photo image along strips at a particular depth measurement into a set of color numerical array samples as a first intermediate data set, wherein higher color complexity along a strip results in a higher number of color numerical array samples for the particular depth measurement;
   transforming, by a computer, the set of color numerical array samples into a formation image log as a secondary intermediate data set;
   calibrating, by a computer, the formation image log for consistency with additionally available data; and
   generating, by a computer, 3D lithofacies interpretation and prediction data using the calibrated formation image log.

2. The method of claim 1, wherein geospatially anchoring the dimensionless 360-degree well core sample photo image includes using at least one of compass direction, latitude/longitude, Global Positioning System (GPS) coordinates, or depth reference data.

3. The method of claim 1, wherein the set of color numerical array samples comprises data for at least one of blue, green, grayscale, or red.

4. The method of claim 1, wherein the formation image log is in borehole image log format.

5. The method of claim 1, wherein the additionally available data includes at least one of wellbore azimuth data, borehole image log data, or 3D seismic data.

6. The method of claim 1, further comprising:
comparing data associated with the formation image log to the additionally available data; and
determining that the formation image log needs to be calibrated because a result of the comparison exceeds a threshold value.

7. The method of claim 1, further comprising generating 3D models of lithofacies distributions using the 3D lithofacies interpretation and prediction data.

8. A non-transitory, computer-readable medium storing computer-readable instructions executable by a computer and configured to:
receive a dimensionless 360-degree well core sample photo image;
geospatially anchor the received dimensionless 360-degree well core sample photo image by enhancing the dimensionless 360-degree well core sample photo image with three-dimensional geospatial positioning data;
decompose the geospatially-anchored 360-degree well core sample photo image along strips at a particular depth measurement into a set of color numerical array samples as a first intermediate data set, wherein higher color complexity along a strip results in a higher number of color numerical array samples for the particular depth measurement;
transform the set of color numerical array samples into a formation image log as a secondary intermediate data set;
calibrate the formation image log for consistency with additionally available data; and
generate 3D lithofacies interpretation and prediction data using the calibrated formation image log.

9. The medium of claim 8, wherein geospatially anchoring the dimensionless 360-degree well core sample photo image includes using at least one of compass direction, latitude/longitude, Global Positioning System (GPS) coordinates, or depth reference data.

10. The medium of claim 8, wherein the set of color numerical array samples comprises data for at least one of blue, green, grayscale, or red.

11. The medium of claim 8, wherein the formation image log is in borehole image log format.

12. The medium of claim 8, wherein the additionally available data includes at least one of wellbore azimuth data, borehole image log data, or 3D seismic data.

13. The medium of claim 8, further comprising instructions configured to:
compare data associated with the formation image log to the additionally available data; and
determine that the formation image log needs to be calibrated because a result of the comparison exceeds a threshold value.

14. The medium of claim 8, further comprising instructions configured to generate 3D models of lithofacies distributions using the 3D lithofacies interpretation and prediction data.

15. A computer system, comprising:
at least one computer interoperably coupled with a memory storage and configured to:
receive a dimensionless 360-degree well core sample photo image;
geospatially anchor the received dimensionless 360-degree well core sample photo image by enhancing the dimensionless 360-degree well core sample photo image with three-dimensional geospatial positioning data;
decompose the geospatially-anchored 360-degree well core sample photo image along strips at a particular depth measurement into a set of color numerical array samples as a first intermediate data set, wherein higher color complexity along a strip results in a higher number of color numerical array samples for the particular depth measurement;
transform the set of color numerical array samples into a formation image log as a secondary intermediate data set;
calibrate the formation image log for consistency with additionally available data; and
generate 3D lithofacies interpretation and prediction data using the calibrated formation image log.

16. The system of claim 15, wherein geospatially anchoring the dimensionless 360-degree well core sample photo image includes using at least one of compass direction, latitude/longitude, Global Positioning System (GPS) coordinates, or depth reference data.

17. The system of claim 15, wherein the formation image log is in borehole image log format.

18. The system of claim 15, wherein the additionally available data includes at least one of wellbore azimuth data, borehole image log data, or 3D seismic data.

19. The system of claim 15, further comprising instructions configured to:
compare data associated with the formation image log to the additionally available data, the additionally available data including at least one of wellbore azimuth data, borehole image log data, or 3D seismic data; and
determine that the formation image log needs to be calibrated because a result of the comparison exceeds a threshold value.

20. The system of claim 15, further comprising instructions configured to generate 3D models of lithofacies distributions using the 3D lithofacies interpretation and prediction data.

* * * * *